Sept. 26, 1967 G. MATHUS 3,343,666

TAPE REEL CASE WITH LOCK

Filed Dec. 22, 1965 2 Sheets-Sheet 1

Gregory Mathus INVENTOR.

BY Wolf, Greenfield & Hieken

ATTORNEYS

TAPE REEL CASE WITH LOCK

Filed Dec. 22, 1965 2 Sheets-Sheet 2

INVENTOR.
Gregory Mathus
BY
Wolf, Greenfield + Hieken
ATTORNEYS 3,343,666
Patented Sept. 26, 1967

3,343,666

TAPE REEL CASE WITH LOCK

Gregory Mathus, West Hartford, Conn., assignor to Data Packaging Corp., Cambridge, Mass., a corporation of Massachusetts Filed Dec. 22, 1965, Ser. No. 515,598
10 Claims. (Cl. 206—52)

This invention relates to tape and film reel cases and more particularly comprises a new and improved case that provides a sealed chamber for a reel and has a convenient lock for maintaining the case closed and sealed about the reel.

It is essential that cases for storing reels have dependable and easily operable locking mechanisms for securing the case cover on the base so that the case does not accidentally open and spill the reel from it. It is very desirable that the locking mechanism in whatever form not generate particles due to friction in operation of the parts of the lock, because particles deposited on the tape not only are physically harmful to the tape but also may cause the tape to supply false information to the machine on which it is used.

The convenience of operation of the lock is in part dependent upon the depth of the handle. If the lock provided in the center of the cover has a deep handle which may be firmly grasped by the operator, the lock may be easily and conveniently actuated. In certain of the prior art devices, the handle depth is quite shallow, and it is consequently quite difficult to rotate the handle so as to close and release the lock.

One important object of this invention is to provide a reel case having a lock which provides a very firm connection between the cover and case so that they may not separate accidentally.

Another important object of this invention is to provide a relatively large handle to facilitate actuation of the locking mechanism.

Another important object of this invention is to provide a locking mechanism which does not generate particles that may be deposited on tape on a reel stored in the case.

To accomplish these and other objects the reel case of this invention comprises a cover and a base, and a cylindrical wall extends upwardly from the center of the base and fits within the hub of a reel placed in it. A cylindrical well in the cover extends downwardly from its center. A flexible grommet surrounds the well in the cover and fits within the cylindrical wall in the base when the case is closed. Gripping means on the inside of the cylindrical wall are adapted to be engaged by the grommet. A handle is disposed within the well of the cover, and actuating means connect the handle and the grommet causing the grommet to enlarge and engage the gripping means to lock the case closed when the handle is in an operative position.

These and other objects and features of this invention along with its incident advantages will be better understood and appreciated from the following detailed description of several embodiments thereof, selected for purposes of illustration and shown in the accompanying drawing, in which.

Figure 1:
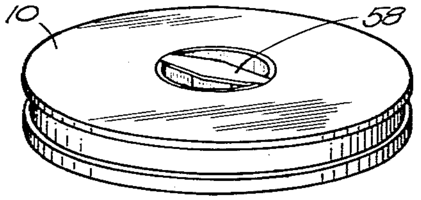
FIG. 1 is a perspective view of a reel case constructed in accordance with this invention.

The case shown in FIG. 1 includes a cover 10 and a base 12 joined together by a locking mechanism 14. The cover 10 is provided with a downwardly extending skirt 16 at its periphery, and the lower edge 18 of the skirt engages a gasket 20 seated in a trough defined by an outer flange 22 on the base 12, and an inner upwardly extending skirt 24. The skirts and gasket cooperate to form a seal about the case to provide a dust free enclosure for reels stored in the case.

Figure 2:
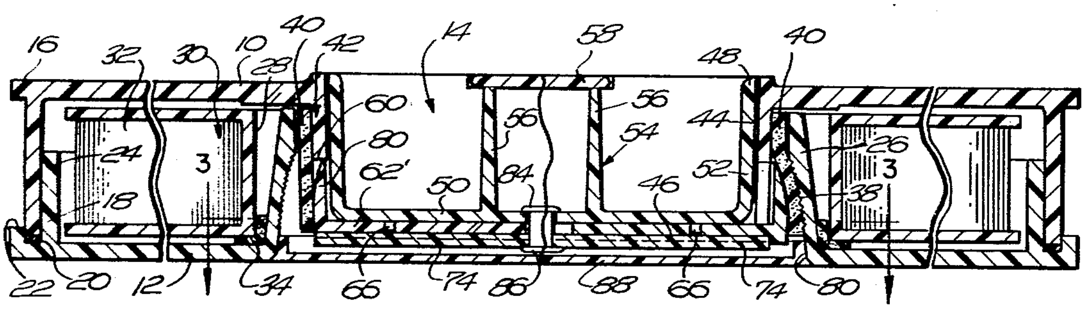
FIG. 2 is an enlarged fragmentary cross-sectional view taken along the section lines 2—2 of FIG. 3 of one embodiment of a lock in the reel case shown in FIG. 1 with the halves of the lock shown in the extreme positions and with a reel disposed in the case.
Figure 3:
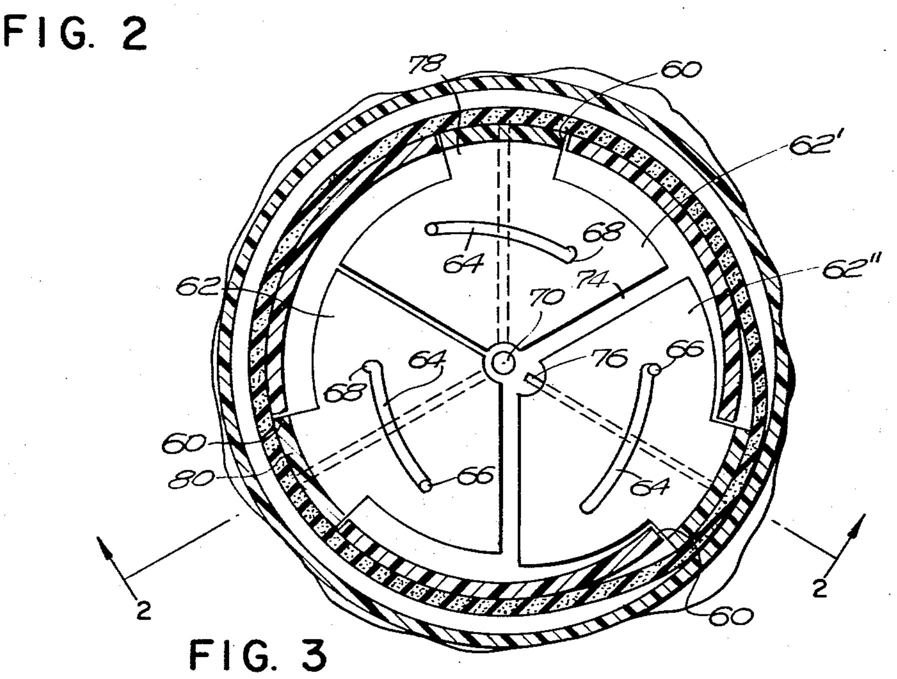
FIG. 3 is a cross-sectional view taken along the section line 3—3 of FIG. 2.

In accordance with the embodiments of this invention, the locking mechanism 14 may take one of several different forms. In the embodiment of FIGS. 2 and 3 the base 12 is provided with an upwardly extending generally cylindrical wall 26 which fits within the hub 28 of a reel 30 stored in the enclosure 32 defined by the cover and base. The reel 30 is shown in FIG. 2 to rest upon a supporting gasket 34 which surrounds the base of the wall 26. The wall 26 tapers upwardly slightly and is provided on its inner surface with a serrated portion 38 which is adapted to be engaged by the grommet 40 that forms part of the locking mechanism.

The cover 10 is provided with a cylindrical well 42 at its center of a diameter slightly smaller than the inner diameter of the wall 26. The well 42 includes a cylindrical wall 44 and a bottom wall 46 that together define a seat for a dish-shaped handle 48. The handle 48 includes a bottom wall 50 and a side wall 52 and is designed to rotate within the well 42. The dish-shaped handle 48 also includes a gripping member 54 that extends across the diameter of the handle to provide a convenient means for rotating the handle in the well. The gripping member 54 is shown in FIG. 2 to include a pair of generally parallel side walls 56 and a cover plate 58.

Three slots 60 are provided in the well 42 at the base of its cylindrical side wall 44. Three pie-shaped plates 42 are disposed on the bottom wall 46 of the well, and each is designed to move radially in the well in response to rotation of the handle. Each plate 62 has an arcuate slot 64 that serves as a cam track for a pin 66 that extends downwardly from the bottom surface of the bottom wall 50 of the handle. The slots 64 are shown to define a path which varies in distance from the center of the handle. That is, the end 68 of each slot lies closer to the center 70 of the handle than does the other end of each slot. The pins 66 which extend downwardly from the bottom of the bottom wall 50 of the handle are of course at a fixed distance measured radially from the center 70, and consequently, when the handle is rotated and the pins 66 move along the slot, the plates 62 move radially in and out, depending upon the direction of rotation of the pins. When the pins lie at the inner end of the slots, the plates are in their extended radial position, and when the pins lie at the outer ends of the slots, the plates lie in their inner radial position.

Each plate 62 may carry a downwardly extending rib 74 that lies within a radial track 76 in the upper surface of the bottom wall 46 of the well. The tracks and ribs serve as guides to limit the motion of the plates to the radial direction. Actuation of the plates comes from the pins 66 and the arcuate slots 64.

Each plate 62 has an outer portion 78 that extends through one slot 60 at the bottom of the cylindrical wall 44 of the well. The outer portions 78 of the plates carry upstanding arcuate flanges 80 that bear against the inner surface of the grommet 40. In FIGS. 2 and 3, the plate 62' is shown in its radial inner position, and the upstanding flange 80 lies within the slot 60. Therefore, the flange 80 of that plate does not bear against and expand the grommet 40. On the right side of FIG. 2, the plate 62" is shown in its outer radial position with the flange 80 bearing against the grommet 40 and pushing it against the grippable section 38 of the wall 26 in the base 12. It will be noted in FIG. 2 that when the plate is in that position, the effective diameter of the grommet 40 exceeds the inner diameter of the wall 26 and therefore prevents the cover 10 from being removed from the base. It is obvious in FIG. 2 that the grommet 40 cannot be withdrawn from within the wall 26 because of the shape of the wall 26 and its reduced diameter at the top.

To operate the locking mechanism 14, it is only necessary to rotate the handle between the two extreme positions defined by the limits of the arcuate slots 64. Thus, merely by rotating the handle through approxmiately 60° the lock is moved from its operative to its inoperative position. The handle is supported for rotation in the well of the cover by rivet having one head 84 disposed within the gripping member 54 and a second head 86 disposed beneath the bottom wall 46 of the well. When the case is closed, the rivet is completely hidden because the head 84 is inside the grip and the head 86 is hidden by the disc 88 which closes the bottom of the cylindrical wall on the base.

Figure 4:
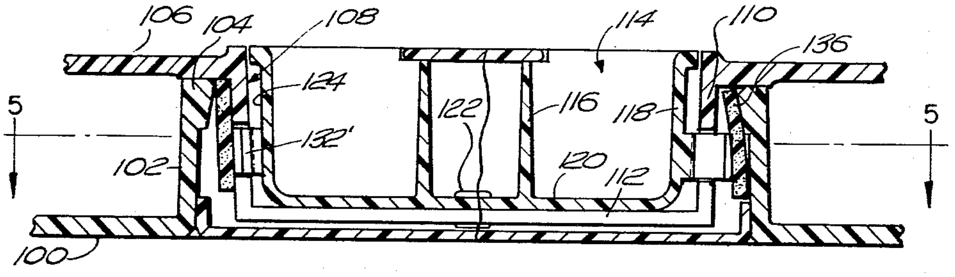
FIG. 4 is an enlarged fragmentary cross-sectional view, similar to that of FIG. 2, of another embodiment of locking mechanism.
Figure 5:
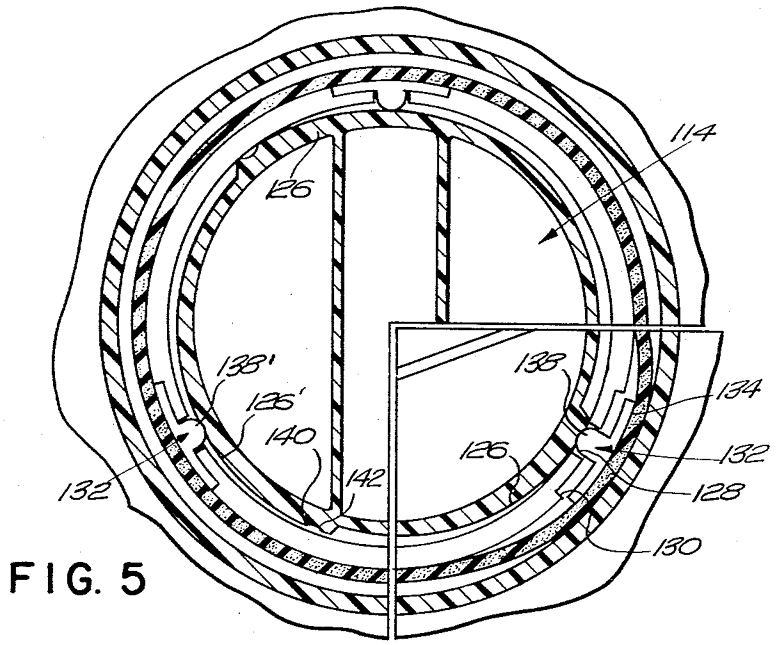
FIG. 5 is a cross-sectional view taken along the section line 5—5 of FIG. 4.

The embodiment of FIGS. 4 and 5 is similar to that of FIGS. 2 and 3. The basic configuration of the tray and cover are the same as in the first embodiment. That is, the tray 100 includes an upstanding cylindrical wall 102 at its center, in turn provided with a grippable portion 104. The cover 106 has a well 108 provided at its center defined by a cylindrical side wall 110 and a bottom wall 112, and the well fits within the cylindrical wall 102 in the base when the case is closed. A dish-shaped handle 114 having a finger grip 116, side wall 118 and bottom wall 120 is rotatable in the well 108 of the cover and is secured in place for rotation by the rivet 122. The outer surface 124 of the handle 114 carries three equally spaced cam surfaces 126 each extending over arcs of approximately 60°.

The cylindrical wall 110 of the well 108 is provided with three openings 128 each at the base of a recess 130, which receive presser members 132. Each member 132 includes a plate 134 that bears against the inner surface of grommet 136 and a cam follower 138 that extends through the slot 128 and bears against one cam surface 126. Each member 132 is capable of moving radially with respect to the well under the influence of its actuating cam surface 126.

On the left sides of FIGS. 4 and 5, the presser members 132' are shown confined within the wall 110 of the well and are retained in place by the grommet 136 which in its unstretched condition bears against the outer surface of the wall. The grommet serves to bias the presser member 132' in the retracted position illustrated, and the presser member is moved against the bias imposed by the grommet under the influence of the cam surface 126. Referring to FIG. 5, as the handle rotates clockwise, the cam surface 126' moves so that its outermost radial portion 140 bears against the cam follower 138' until the follower seats in the recess 142 provided at the end 140. This condition is shown on the right side of FIG. 4 and in the lower right quadrant in FIG. 5. When the presser member is pushed outwardly by the cam surface 126, it expands the grommet 136 so that its effective diameter is greater than the diameter of the grippable portion 104 of the wall 102. Consequently, the cover cannot be withdrawn, and the grommet serves as a lock to maintain the cover and base together. It is evident that when the handle 114 is turned, all three presser members move together either inwardly or outwardly to release or expand the grommet causing it to either lock or disengage the grippable member 104.

In each of the embodiments of FIGS. 2 and 4, a handle is provided of maximum depth in that the depth of the handle approaches the total thickness of the case. Because the grommets in each embodiment surround the well in the cover, they do not detract from the depth of the handle as is the case in prior art devices where the grommet is disposed beneath the well and extends into a cavity within the recess in the base. Because the grommet is large in diameter, the effective gripping area between it and the grippable portion of the wall in the base is correspondingly large, and the effectiveness of the lock is enhanced.

Figure 6:
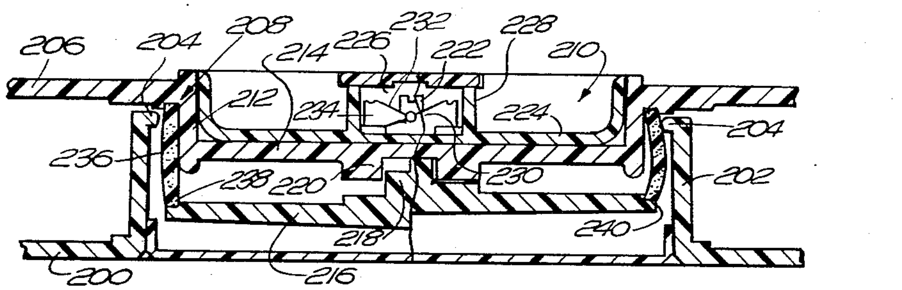
FIG. 6 is an enlarged fragmentary cross-sectional view, similar to that of FIG. 2, of yet another embodiment of this invention.

The embodiment of FIG. 6 includes a base 200 having an upstanding cylindrical wall 202 with a grippable portion 204 at its upper end. The cover 206 is provided with a well 208 somewhat shallower than the wells of the other embodiments, within which is disposed a handle 210. Handle 210 is substantially identical to the handle shown in Burgess et al. Patent No. 3,074,546 dated Jan. 2, 1963. The well 208 includes a cylindrical side wall 212 and a bottom wall 214 beneath which is mounted a keeper 216 that moves axially with respect to the well 208. The keeper 216 has a noncircular hub 218 extending upwardly from its center which registers with a recess 220 of similar cross section to prevent the keeper 216 from rotating with respect to the well. The keeper hub 218 carries a stud 222 that extends upwardly through the bottom wall 214 of the well and through the bottom wall 224 of the handle 210, and terminates in the chamber 226 within the grip 228. A cam follower 230 in the form of a pin extends radially through the stud 222 and engages the cam face 232 of cam member 234 disposed in the chamber 226. The cam 234 is seated in the chamber 226 and rotates with the handle 210. Therefore, the stud 222 moves axially up and down in response to handle rotation.

A grommet 236 surrounds the outer surface 212 of the well 208, and its lower edge 238 is seated in a recess 240 at the periphery of the keeper 216. When the handle is positioned so that the follower 230 is disposed on the low portion of the cam surface 232, the keeper is in the low position shown at the left in FIG. 6 and the grommet 236 is cylindrical in shape and bears against the outer surface of the cylindrical wall 212 of the well. However, when the handle is turned approximately 90° so that the pin 230 rides upwardly on the cam surface, the keeped 216 rises (as shown on the right side of FIG. 6) and the grommet 236 buckles outwardly in the manner shown. The outward buckling of the grommet 236 causes it to bear against the grippable portion 204 at the top of the wall 202 on the base and consequently prevents the cover 206 from being removed from the base 200.

From the foregoing description it is evident that the embodiment of FIG. 6, like the other embodiments, provides a grommet of large diameter which in turn provides greater frictional engagement with the base when the lock is in the closed condition. Consequently, the embodiment of FIG. 6, like the other embodiments, provides a firmer locking mechanism to retain the assembly in the closed condition. In all of the embodiments, the parts which generally engage one another and which may generate some particles upon actuation of the lock, are confined within the well so that the particles may not readily be deposited on the tape stored on the reel in the case. In the embodiment of FIG. 6, the grommet is bowed or barrelled outwardly by the axially applied forces on the edges of the grommet. That is, in the embodiment of FIG. 6 the grommet is compressed between the periphery of the keeper 216 and the upper end of the well 208 of the cover, while in the embodiments of FIGS. 2 and 4, the grommet is pushed outwardly by radially applied forces.

Those skilled in the art will appreciate that numerous modifications may be made of this invention without departing from its spirit. Therefore, it is not intended to limit the breadth of this invention to the specific embodiments illustrated and described. Rather, it is intended that the scope of the invention be determined by the appended claims and their equivalents.

What is claimed is:

1. A reel case comprising a cover and a bottom tray, a cylindrical wall extending upwardly in the center of the bottom tray of a diameter slightly less than that of a reel hub for fitting within the hub of a reel placed in the tray with the cylinder defined by the cylindrical wall being open at the top, a circular well extending downwardly in the center of the cover and of a diameter slightly less than the diameter of the cylinder and extending into the cylinder through the open top when the cover is placed on the bottom tray, a flexible grommet surrounding the well in the cover and fitting within the cylindrical wall when the case is closed, grippable means provided on the inside of the cylindrical wall and adapted to be engaged by the grommet, a movable handle disposed within the well of the cover, and actuating means connecting the handle to the grommet causing it to enlarge and engage the grippable means to lock the case closed when the handle is in an operative position.

2. A reel case as defined in claim 1 further characterized by said handle including a dish-shaped plate rotatable in the bottom of the well and extending upwardly to cover the sides of the well.

3. A reel case as defined in claim 1 further characterized by the actuating means including a plurality of circumferentially spaced radially movable presser plates engaging the inside of the grommet and pushing the grommet outwardly at selected points to engage the grippable means.

4. A reel case as defined in claim 1 further characterized by said handle being rotatable in the well of the cover.

5. A reel case as defined in claim 4 further characterized by said grommet being cylindrical in shape and being generally flexible so that it can barrel outwardly when its top and bottom edges are pressed toward one another, said actuator including a keeper disposed below the well on the cover and engaging the lower edge of the grommet, means constraining the keeper to movement in an axial direction on the cover, and means connecting the keeper to the handle causing the keeper to move toward the cover well and compress the grommet when the handle is turned in one direction to barrel the grommet so that it engages the grippable means, and to move away from the well and relieve the grommet when turned in the other direction.

6. A reel case as defined in claim 5 further characterized by the connecting means including a stud extending upwardly from the keeper into the handle, and an enclosed cam and follower operatively connected to the stud and handle for moving the stud in response to rotation of the handle.

7. A reel case as defined in claim 4 further characterized by the actuating means including a plurality of circumferentially spaced radially movable presser plates engaging the inside of the grommet and pushing the grommet outwardly at selected points to engage the grippable means.

8. A reel case as defined in claim 7 further characterized by a cam member carried by the handle and operatively connected to the presser plates for moving the plates radially outwardly when the handle is turned in one direction and moving the plates radially inwardly when the handle is turned in the other direction.

9. A reel case as defined in claim 8 further characterized by said cam member including a plurality of cam surfaces carried by the handle and facing the presser plates, and cam followers connected to the plates and bearing against the surfaces.

10. A reel case as defined in claim 8 further characterized by.

said cam member including a plurality of pins extending downwardly from the handle and rotatable with the handle, a plate connected to each pressure plate and lying below the handle, a cam track formed in each plate and each track receiving one pin, said tracks varying radially from the center of the handle over their lengths so that the plates move radially as the pins move in the tracks.

References Cited

UNITED STATES PATENTS

| | | | |
|---|---|---|---|
| 1,573,312 | 2/1926 | Fritz | 292—300 X |
| 1,907,528 | 5/1933 | Evan | 292—140 X |
| 2,508,827 | 5/1950 | Holden | 285—8 |
| 2,721,089 | 10/1955 | Shames | 285—8 |
| 3,004,658 | 10/1961 | Rahklau | 206—52 |
| 3,107,687 | 10/1963 | Howe | 285—338 X |

FOREIGN PATENTS

| | | |
|---|---|---|
| 611,375 | 12/1960 | Canada. |

THERON E. CONDON, *Primary Examiner.*

LOUIS G. MANCENE, *Examiner.*

J. M. CASKIE, *Assistant Examiner.*